Oct. 27, 1970   L. VON BOGDANDY ET AL   3,536,455
PLANT FOR THE PRODUCTION OF METALLURGICAL REDUCING GAS
Original Filed Nov. 29, 1965   2 Sheets-Sheet 1

Ludwig von Bogdandy
Heinz-Dieter Pantke
INVENTORS.

BY

Karl G. Ross
Attorney

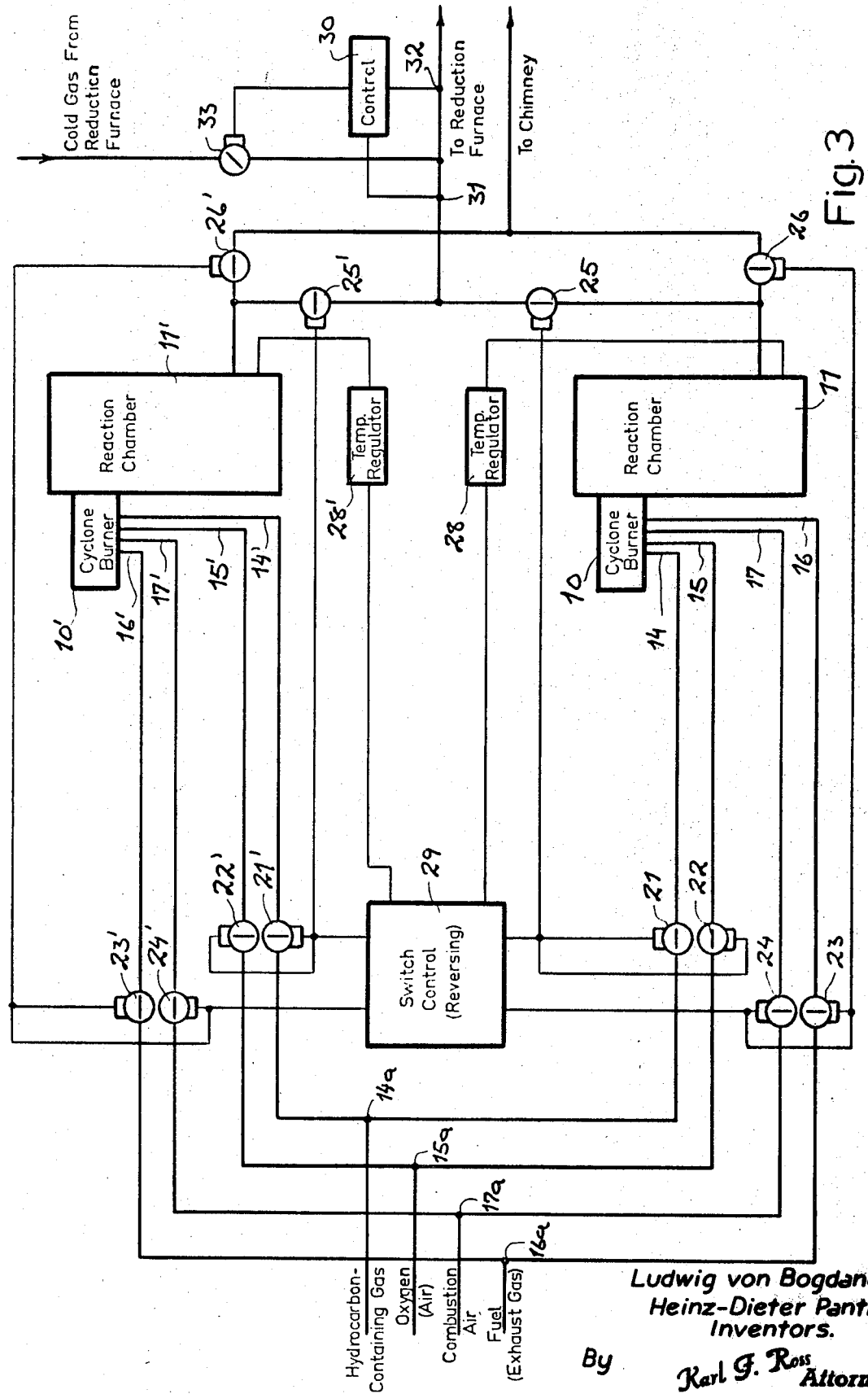

3,536,455
PLANT FOR THE PRODUCTION OF METAL-
LURGICAL REDUCING GAS
Ludwig von Bogdandy, Oberhausen, and Heinz-Dieter
Pantke, Essen-Frintrop, Germany, assignors to Hutten-
werk Oberhausen A.G., Oberhausen, Rhineland, Ger-
many, a corporation of Germany
Original application Nov. 29, 1965, Ser. No. 510,224.
Divided and this application Oct. 17, 1968, Ser.
No. 768,404
Claims priority, application Germany, Feb. 24, 1959,
H 35,709
Int. Cl. B01j 7/00
U.S. Cl. 23—281                                    2 Claims

ABSTRACT OF THE DISCLOSURE

Apparatus for the production of a metallurgical reduction gas comprising a pair of reaction chambers with refractory latticework; each having a cyclone burner opening directly into the reaction chamber; the supply means of hydrocarbon-containing gas, oxygen-containing gas, and heating gas are so arranged that the reaction chambers can be operated in a reversible manner.

---

This application is a division of our application Ser. No. 510,224, filed Nov. 29, 1965, as a continuation-in-part of our then pending application Ser. No. 10,124, filed Feb. 23, 1960 (now abandoned).

The invention relates to a process and an installation or apparatus for the transformation of hydrocarbons to gas mixtures which are suitable for the direct reduction of metal oxides to elementary metals without an aftertreatment of the gas mixture.

The manufacture of metallurgical reduction gases especially from saturated-hydrocarbons, such as methane, is known. Thus, the usual process involves the reaction or transformation of the hydrocarbon with an excess of oxygen or oxidizing medium in the presence of a catalyst to a gas mixture which consists essentially of hydrogen and carbon monoxide, although containing disadvantageous quantities of water vapor and carbon dioxide. The existence of such oxidation product in the gas increases the difficulty in reducing metal oxides.

It is known, for example, that gas mixtures consisting of 70% carbon monoxide and 30% carbon dioxide or 63% hydrogen and 37% H₂O are no longer suitable at a temperature of 1000° C. for the reduction of iron oxide (FeO) to elemental iron (Fe). For the use of gas mixtures of this general type as reduction gases in metallurgical processes, the water vapor and carbon dioxide must first be removed. It has been proposed, for this purpose to cool the gas mixture and thereby to condense the water vapor and simultaneously or in a separate step to wash the carbon dioxide from the gas. While these processes indeed remove the oxidizing impurities from the reduction gas, they also involve the cooling of the gas mixture so that, for use of the gas in reduction of metallurgical ores, the gas must first be reheated.

It is a primary object of the present invention, therefore, to provide a plant for the production of reducing-gas mixtures of carbon monoxide and hydrogen which, without further modification or heating, are suitable for the direct reduction of metal ores (especially iron ore) to elemental metals.

A further object of this invention is to provide a plant for the production of an improved reducing gas whose composition and temperature is such that removal of oxidizing agents and reheating is unnecessary prior to the utilization of the gas for reducing metal ores and the like.

It is another object of our present invention to provide a simple and efficient plant for producing a gas mixture which may be employed directly for the reduction of metal ores.

It has been found, according to the invention, that it is possible to carry out in a single processing stage (i.e. without special steps for the removal of water vapor and carbon dioxide) the production of a metallurgical reduction gas consisting predominantly of hydrogen and carbon monoxide in an installation operated in accordance with specific principles of the invention to be described in greater detail below. The process thus dispenses with the physical and chemical after-handling and, generally, reheating of the metallurgical reduction gas. Moreover, a catalyst is not required for the transformation or reaction. The apparatus can be operated fully automatically with the aid of conventional control devices and produces a most economical reduction gas whose composition remains substantially constant over prolonged periods.

When, for example, it is desired to generate a metallurgical reduction gas which is free from the oxidation products—water vapor and carbon dioxide—and which can be used without aftertreatment for the reduction of ores (especially iron ore) it is necessary that as much oxygen be supplied for the transformation as is defined in the following overall reaction formula (with methane as an example):

$$CH_4 + \tfrac{1}{2} O_2 \rightarrow CO + 2H_2 \qquad (1)$$

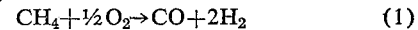

This means that the reaction considered in total requires exactly stoichiometric quantities of methane and oxygen.

The process as described by Equation 1 is viewed in terms of the conditions at the start and termination of the reaction process although it will be understood that, for a more accurate picture of the present invention, the process must be considered to occur in two reaction stages without interruption and extending directly from the first into the second.

The first reaction stage is exothermic and proceeds according to the reaction scheme:

$$4CH_4 + 2O_2 \rightarrow CO_2 + 2H_2O + 3CH_4 \qquad (2)$$

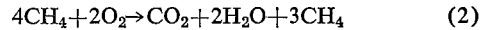

In the second stage of the reaction, which is endothermic and thus requires the supplying of heat, the primary gas mixture of carbon dioxide, water vapor and methane, in the proportions indicated in Equation 2, is reacted with the remaining methane in accordance with the reaction schemes:

$$CH_4 + CO_2 \rightarrow 2CO + 2H_2 \qquad (3)$$

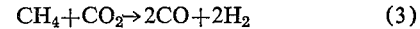

and $$2CH_4 + 2H_2O \rightarrow 2CO + 6H_2 \qquad (4)$$

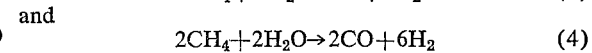

It will be understood, however, that in the first stage the total quantity of oxygen supplied does not react only to form the indicated carbon dioxide and water vapor but already participates in the formation of significant quantities of desirable final components, carbon monoxide and hydrogen. Only a part of the hydrocarbon is reacted to form carbon dioxide and water vapor and later the balance of the hydrocarbon reacts with these components to form additional quantities of carbon monoxide and hydrogen.

Other hydrocarbon such as ethane, propane, butane and the like, which are present in minor amounts in natural gas, by comparison with methane, undergo similar reactions.

In the endothermic or second stage of the reaction (corresponding to Equations 3 and 4 above) the reaction rate and degree of completeness of the reaction increase, by virtue of the endothermic nature of the reaction, as the reaction temperature increases. It is important that, during the period of time in which the exothermic reaction in accordance with Equation 2 raises the temperature of the gas mixture, this temperature is brought to the desirable reaction temperature for the second-stage or endothermic reaction (Equations 3 and 4). With slow heating, there develops a highly undesirable side reaction; this reaction is the cracking of the hydrocarbon with splitting-off of hydrogen and the agglomeration of the hydrocarbon into large molecules which finally results in the formation of elementary carbons in the form of soot or carbon black. This carbon black is not suitable for the reduction of oxide and deposits in the apparatus of the plant while reducing substantially its operating efficiency.

From the foregoing considerations it will be evident that:

(1) The heating of the gases in the first stage, prior to the second stage or the reformation reaction, must be effected as rapidly as possible; and (2) The transition time between the first and second stages of the reaction must be kept at a minimum.

These considerations require, according to the instant invention, the following steps to ensure that the reaction product will be at the elevated temperature required for a metallurgical reduction gas and of the proper composition:

The hydrocarbon-containing gas (natural gas, coke-oven gas etc.) and the oxygen-containing gas are introduced simultaneously via separate ducts generally tangentially into a cylindrical combustion chamber forming a cyclone-type burner, with a flow velocity of preferably at least 60 m./sec. with at least one gas having a minimum velocity of 30 m./sec.

At least one, but preferably both of the gases must have this relatively high flow velocity and it is found that the high velocity ensures an excellent mixing of the gases in small volume units because of the high turbulence at these elevated speeds, particularly when both ducts enter the cyclone chamber at approximately the same region of its periphery. In this turbulent gas-mixing space, the first stage of the transformation reaction (Equation 2) is carried out with the generation of heat to maintain the temperature in the cyclone-burner above the ignition temperature of the gas mixture. After initial ignition, there is no longer any need for an external ignition source.

The cyclone burner opens directly into a reaction chamber filled with a latticework of a refractory heat-storage material (e.g. a ceramic such as fire brick) which can sustain temperatures in excess of 1100° C. The cyclone burner and the reaction chamber thus form a close unit which may be referred to hereinafter as a gas-transformation reactor.

The gas mixture passing from the cyclone burner into the latticework reaction chamber, whose heat-retentive packing is at a temperature of 1100° C. or higher to sustain the second-stage reaction, undergoes reaction in the second-stage chamber in accordance with Equations 3 and 4, supra. Because of the high velocity of the gases flowing through the combustion chamber (cyclone burner), the transfer between this first-stage chamber and the second-stage chamber is effected rapidly, thereby fulfilling the above-mentioned requirements for the rapid mixing of the gases in the first stage, for rapid transfer of the gas mixture from the first stage to the second stage, and for rapid heating of the gas mixture for the second-stage reaction. It has been found that best results are obtained when the cyclone burner forms an input duct for the gases to be fed to the second-stage chamber.

The gases withdrawn from the reaction chamber are at a temperature in excess of about 1000° C. and are found to consist essentially entirely of hydrogen and carbon monoxide with only trace amounts (permissible for use of the gas in the reduction of iron ore) of carbon dioxide, water vapor and unreacted hydrocarbon. The gas mixture thus can be used directly (i.e. without aftertreatment) as a reduction gas. The gases evolving from the reaction chamber consist essentially only of reducing components.

The heat required for the second stage of the transformation reaction results in a cooling of the latticework of heat-retentive fire bricks or the like. Since the temperature within the secondary reaction chamber must not fall below 1000° C., the minimum temperature at which complete gas transformation occurs, we have found to be an important feature of this invention, to bring the temperature in the reaction chamber to a temperature between 1100° C. and 1400° C. before the chamber is used for the transformation or further reaction of another gas mixture from a cyclone burner. The heating of the second-stage chamber can be effected by the regenerative process in which a furnace-exhaust or waste gas from the metallurgical plant or some other source is passed through the chamber and has a sufficiently high temperature to bring the latticework to the desired temperature level. Alternatively, the heating process can be effected with the aid of a fuel in gas, liquid or pulverulent form which is burnt in the cyclone burner. The fuel can be formed at least in part by a waste gas from a metallurgical process. The hot gases stream through the latticework of the reaction chamber and bring it again to a temperature between 1100° and 1400° C. before they are conducted from the device through a chimney.

It may be of interest to note that the reaction chamber with which the present invention is concerned, is markedly different from the usual cupola or Cowper-type furnace in some important respects. In a Cowper-type furnace of the kind used for the regenerative heating of air for subsequent use in a blast furnace, for example, the heating medium and the air are passed in opposite directions through the tower during the heating and heat-removal processes whereby the air leaves the chamber with the highest possible temperature. It will be understood that the regenerative heating processes involving the use of heat-storage means in an elongated chamber require the heating medium to be passed into the device from one end thereof; this end is, at the conclusion of the process, at a temperature somewhat above that of the other end to which the heating gas is removed. When the heat exchange process must be carried out to obtain the highest possible temperature of the gas to be heated, the gas flow must proceed in opposite directions, with the gas to be heated departing the chamber at the side formerly constituting the inlet.

In accordance with the principles of the present invention, however, the heating gas and the gas mixture to be subjected to reaction in the second-stage temperature are passed in the same direction through the packed reaction chamber so that the reaction mixture from the cyclone burner will be exposed as rapidly as possible to the high-temperature side thereof. This insures that the gas mixture to be reformed in the second-stage chamber is rapidly brought to the optimum reaction temperature for the endothermic reformation.

For the continuous generation of metallurgical reduction gases, at least two gas-transformation reactors are employed, according to the invention, each having a cyclone burner and a second-stage reaction chamber coupled therewith. When one of the reaction chambers is being heated, the other sustains the transformation reaction and vice versa. The temperatures in the reaction chambers are sensed by thermosensing elements which are coupled with conventional control devices for assuring the attainment of the minimum temperature level mentioned above at which the complete transformation can occur. When the desired temperature is obtained in the reactor sustaining the heating reaction or when the temperature reaches the lower temperature threshold at which transformation is no longer complete, a control pulse is generated for reversing and interchanging the functions of the gas-transformation reactors. The gas reactor which, in the previous operation sustained the transformation reaction, now is heated by the heating fluid whereas the heated reactor is employed to sustain the transformation reaction.

The reduction gas formed in the transformation chambers, upon leaving the latter, has a temperature of about 1000° C. and a certain desirable precise temperature can be imparted to it, according to this invention, by admixing it with a cold exhaust gas prior to introduction of the gas mixture into the reduction furnace. The exhaust gas preferably is derived from the reduction furnace itself and contains at least 30% by volume hydrogen and 15% by volume carbon monoxide.

The essential features of the instant invention are summarized hereinbelow, it being understood that all of the points enumerated are required for the production of a metallurgical reduction gas, especially for the reduction of iron ore to elemental iron, which does not require reheating or purification before it is introduced into the ore-reduction furnace:

(1) The amount of hydrocarbon-containing gas and oxygen or oxygen-containing gas introduced into the primary-reaction chamber is controlled by metering means so that the proportion of oxygen and hydrocarbon is exactly stoichiometric and in accordance with Equation 1.

(2) The transformation reaction is carried out in two stages without interruption between the stages, the first stage being an exothermic reaction of the hydrocarbon with oxygen or the oxygen-containing compound to produce carbon monoxide and hydrogen together with quantities of carbon dioxide, water vapor and unreacted hydrocarbon; in the second-stage reaction chamber, an endothermic reaction is carried out in accordance with Equations 3 and 4 to convert the gas mixture into the ore-reduction gas which consists substantially entirely of hydrogen and carbon monoxide with only proportionately small and relatively insignificant amounts of water vapor, carbon dioxide and unreacted hydrocarbon.

(3) A minimum temperature of 1000° C. is maintained in the second stage of the transformation reactor by sensing the temperature within the second-stage chamber and interchanging the functions thereof, as previously indicated.

(4) The gas transformation is carried out continuously and employs at least two reactors each having a second-stage reaction chamber provided with a latticework of heat-retentive refractory material and coupled with a cyclone burner opening directly into the respective reaction chamber, the reaction chambers being operated alternately for heating by a heating fluid and for sustaining the secondary reaction.

(5) The minimum temperature for carrying out the transformation reaction is used to trigger automatically the reversal or alternation of the functions of the reactors and can be detected by thermosensing elements for operating control devices which, in turn, trigger suitable switching valves or the like.

(6) The second-stage reactors are heated by passing through them a heating fluid from the cyclone burner to the exhaust side of the reactor and thus in the direction of flow of the gas mixture to be subjected to the second-stage reaction.

The heating gas can be generated in situ within the cyclone burner by combustion of a gaseous, liquid or pulverulent fuel in the presence of oxygen. Alternatively, the heating fluid may derive from other source in the ore-reduction plant with a temperature in excess of 1000° C., the heating fluid being then fed into the reactor through the cyclone burner with or without ancillary combustion.

(7) The heating fluid brings the temperature of the latticework to a level in excess of about 1100° C. and preferably to a temperature ranging between 1100° C. and 1400° C. before being led from the reformation chamber via its chimney.

(8) The hydrocarbon-containing gas and the oxygen or oxygen-containing gas are introduced into the cyclone burner by respective ducts opening tangentially into the chamber essentially in the same plane (perpendicular to the axis of the cyclone burner). At least one of the gases and preferably both have a minimum velocity of about 30 m./sec. upon introduction into the cyclone burner.

(9) Directly at the inlet of these ducts into the cyclone burner there is generated a turbulent stream of the gases whose cyclonic activity is very high because of the high velocity of the gas streams; the resulting turbulence carries the intimately mixed gas in the process of reaction rapidly through the cylindrical cyclone burner and into the reaction chamber on which the cyclone burner is mounted.

(10) The temperature of the combustion-chamber wall is maintained above the ignition chamber of the gas mixture turbulently formed therein so that no external ignition is required; the heat necessary to maintain the temperature at this level is derived from the exothermic reaction of the oxygen-containing gas and the hydrocarbon.

(11) The gas mixture formed in accordance with the Equation 2 passes, as a consequence of its extremely high velocity, rapidly into the hottest portion of the latticework of the reaction chamber where the reformation of the gas mixture is effected in the absence of the catalyst.

(12) The cyclone burner opens directly into the latticework of the second-stage reaction chamber and the transition zone between them is kept as short as possible, thereby minimizing the development of elemental carbon in the form of soot.

(13) The reducing gas has essentially the temperature of the latticework upon its passage from the second-stage reaction chamber, i.e. a temperature of at least 900° C. and preferably between 900° and 1100° C.

(14) The temperature of the reducing gas is adjusted to the precise desired temperature, say 900° to 950° C., by admixing with the gas mixture emerging from the second-stage reaction chamber a relatively cool exhaust gas from a metallurgical furnace (e.g. the reducing furnace to which the gas is fed), the relatively cool gas containing about 30% by volume hydrogen and 15% by volume carbon monoxide.

(15) The resulting reducing gas is used for the direct reduction or ores and especially iron ore without after-treatment.

(16) The apparatus is controlled by sensing and control devices including reversing or switching valves in the inlet and outlet ducts for the gas-transformation reactor completely automatically.

The above and other objects, features and advantages of the present invention will be more readily apparent from the following description, reference being made to the accompanying drawing in which:

FIG. 3 is a block-diagram of a plant operated in accordance with the method of the present invention for the production of a metallurgical reducing gas.

Figure 1:
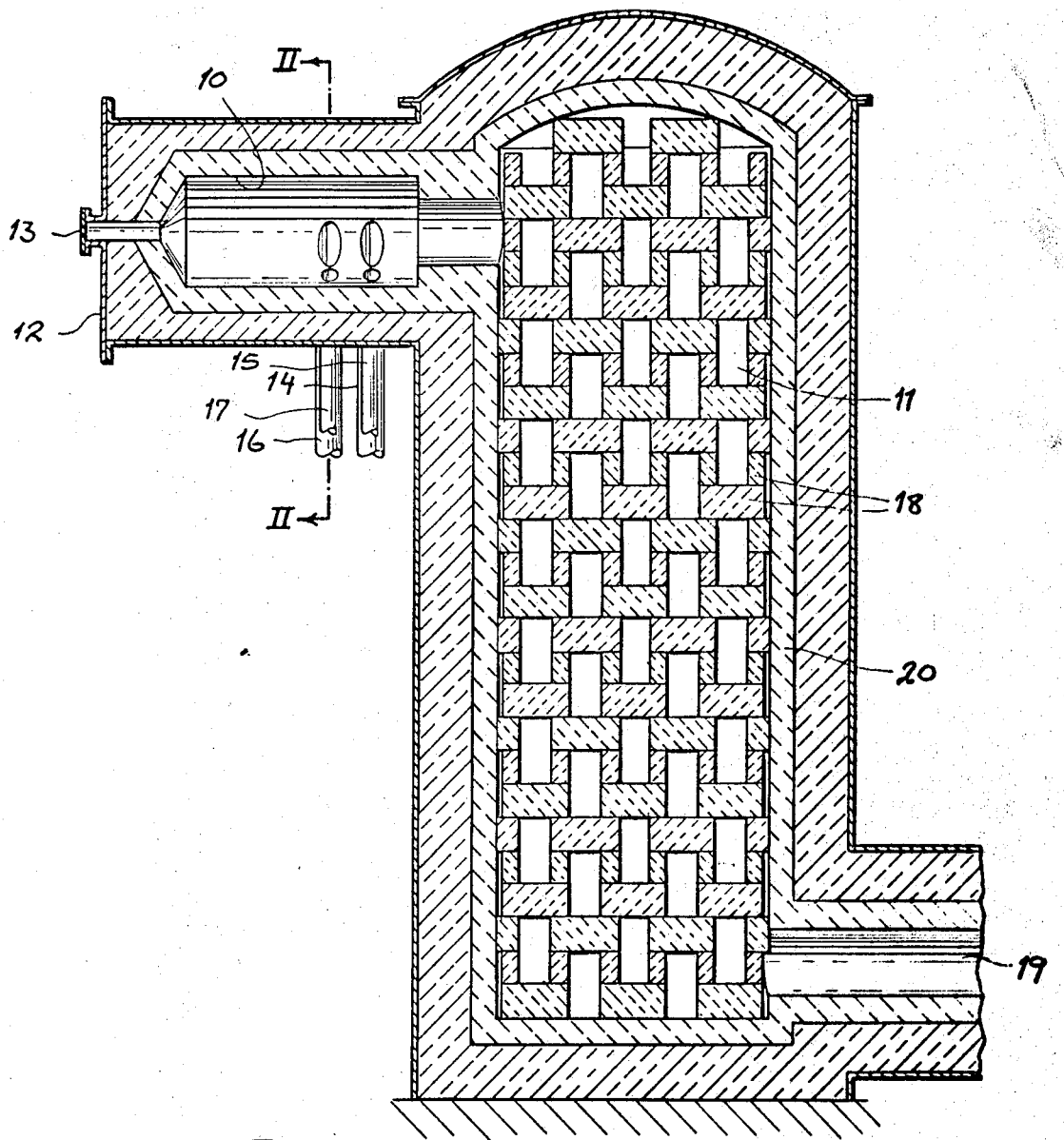
FIG. 1 is a vertical cross-sectional view through a gas-transformation reactor according to the present invention.
Figure 2:
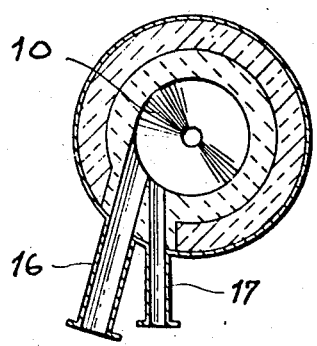
FIG. 2 is a cross-sectional view taken along the line II—II of FIG. 1.

From FIGS. 1 and 2 it can be seen that a reactor for the production of a reducing gas, according to the present invention, comprises a cyclone burner 10 having a horizontal axis and opening directly into an upright reaction chamber 11, the assembly 10 and 11 constituting a closed unit. The cyclone burner 10, in which the first stage of the gas-transformation reaction is carried out, is provided with a closure plate having a viewing passage 13 through which the interior of the cyclone burner can be observed and its wall temperature determined by an optical pyrometer or the like. The inlet openings of the cyclone burner 10 are, as can be seen from FIG. 2, paired in common planes perpendicular to the axis of the cylindrical burner chamber in order to promote the vortex turbulence by means of which an intimate mixture of the gases is obtained. The hydrocarbon-containing gas is supplied to the combustion chamber via the duct 14 while the oxygen-containing gas is fed thereto by the duct 15. The ducts 16 and 17 are provided for the heating fluid or fluids. When, for example, the reaction chamber is to be regeneratively heated by a hot exhaust gas of a furnace, the exhaust gas is supplied to the chamber via the duct 16. When the heating is to be effected by the combustion of a fuel, the latter is supplied via the duct 16 while oxygen or an oxygen-containing gas (e.g. air) is fed to the chamber 10 via the duct 17. Thus the ducts 14, 15 and 16, 17 function alternately for the production of reducing gas and the reheating of the latticework of the reactor. The fuel and hydrocarbon gases flow tangentially into the combustion chamber 10 via the ducts 16 and 14 respectively, along the inner wall of the cyclone burner while the combination air and oxygen-containing gas are supplied by the ducts 17 and 15, respectively, into an inner zone of the chamber, thereby preventing damage to the refractory lining of the chamber at the inlets by the high temperatures of combustion.

The reaction chamber 11 contains a latticework of refractory bricks 18 and also has a lining 20 of refractory material. Suitable refractories for the purposes of the present invention include the aluminum oxides and ceramics commonly used in high-temperature regenerative heaters. During heating of the latticework, a hot exhaust gas or fuel is supplied to the cyclone burner 10 via the duct 16 while combustion air is fed into the latter by the duct 17 with the hot waste gases being led through the latticework and out to a chimney via the outlet 19. The hot gas transfers its sensible heat to the refractory block 18 which stores this heat and is brought to a temperature between 1100° and 1400° C. Since the waste gases are of a temperature of about 1100° C. as they pass through the outlet 19, they can be fed through a heating exchanger prior to discharge from the plant, thereby enabling an additional part of the available heat content to be recovered.

For the transformation reaction, the hydrocarbon-containing gas is fed through the duct 14 and oxygen or oxygen-containing gas is supplied through the duct 15 at high speed to the cyclone burner 10. The intimate mixing of the gases results from their high-speed meeting in relatively small unit volumes. The hot walls of the cyclone burner, which were raised to the ignition temperature in the previous heating period, effect an ignition of the mixture and produce the exothermic reaction of the first stage of the transformation. The resulting gas mixture passes from the cyclone burner with a higher velocity into the reaction chamber 11 in which the exothermic second stage of the transformation reaction occurs while the gas mixture streams through the hot latticework 18. The gas mixture is thus transformed into a metallurgical reducing gas consisting essentially of carbon monoxide and hydrogen. The reducing gas passes through the outlet 19 and is introduced, without aftertreatment, into an apparatus for the direct gas-reduction of a metallurgical ore.

The operation of the plant will be seen in greater detail from the block diagram of FIG. 3 which shows a plant having two second-stage reaction chambers 11 and 11' forming closed units with their respective cyclone burners 10, 10'.

In one of the gas-transformation reactors 10, 11 or 10', 11', the transformation reaction is carried out to produce a reducing gas which is fed to a reducing furnace (not shown) while the other gas-transformation reactor is being heated. The apparatus thus makes possible a continuous generation of the reducing gas. The temperatures in the second-stage reaction chambers 11, 11' are measured by thermosensitive elements which register their readings in respective control devices; upon the attainment of an adjustable predetermined minimum temperature for the endothermic second stage reaction, an electrical impulse is generated by the control device for the switching of valve means capable of interchanging the functions of the gas-transformation reactors. The reactor which previously generated reducing gas is then reheated while the previously heated generator is used to produce the reduction gas. As shown in FIG. 3, the reactor 10, 11 is considered to produce the reducing gas and has its valves 21 and 22 in the hydrocarbon and oxygen supply lines 14a and 15a in the open condition. Valves 23 and 24 connected between the fuel/waste-gas line 16a and the combustion-air duct 17a, respectively, and the input ducts 16 and 17 are closed. At the same time, valves 23' and 24' in series with the ducts 16' and 17' of the cyclone burner 10' of the other reactor permit fuel or waste gas and generally combustion air to flow from the lines 16a and 17a to the reaction chamber 11'. Thus the latter reaction chamber is reheated as previously described. The fuel in general will be the exhaust gas of the reduction apparatus to which the gas plant is connected. The combustion products forming the heating fluid generated in burner 10' by the combustion of the fuel with the combustion air pass through the latticework of the reaction chamber 11' and flow from the latter, after heating it to a temperature of 1100° to 1400° C., through the exhaust duct to the chimney via valve 26'. The valves 21', 22' and 25' of the reactor 10', 11', undergoing heating are closed.

The hydrocarbon-containing gas and the oxygen carrier enter the combustion chamber 10 via open valves 21 and 22 generally tangentially to produce an intimate mixture. The hot refractory lining of the previously heated cyclone burner 10 ignites the gas mixture to initiate the first stage of the transformation reaction. The resulting gas mixture flows through the previously heated latticework of the reaction chamber 11 in which the second stage of the transformation is carried out. The reducing gas thus produced consists essentially of hydrogen and carbon monoxide and is conveyed through the outlet 19 and valve 25 to the ore-reducing apparatus. Since the reduction chamber 11 is cooled by the endothermic second-stage reaction, its temperature and that of the reducing gas falls as sensed by the control device 30 which measures the temperatures at points 31 and 32 along the reducing-gas outlet line. Between these points, a cold exhaust gas of the reducing furnace is supplied over an adjustable valve 33 controlled by the temperature regulator 30. The temperature variations of the reducing gas can thus be held within relatively narrow limits inasmuch as a temperature increase above the desired reducing-gas temperature at the outlet of the plant leads directly to an increase in the amount of the cold gas mixed therewith and vice versa. When the temperature in the reaction chamber 11 reaches a minimum valve selectable between about 1000° and 1200° C., the regulator 28 provides an impulse to the switching system 29 to reverse the valves 21–24 and 21'–24', thereby interchanging the functions of the input sides of the reactors and reversing the valves 25, 26 and 25', 26' correspondingly. Thus one of the reactors always is producing the reducing gas and the output of the plant is continuous.

EXAMPLE

In a plant of the type shown in FIG. 3, the hydrocarbon-containing gas is a coke-oven gas having the following composition, in volume percent:

$CH_4$ ---------------------------------------------- 53
$H_2$ ----------------------------------------------- 14
$CO$ ----------------------------------------------- 12
$CO_2$ ---------------------------------------------- 1
$N_2$ ----------------------------------------------- 20

In accordance with the stoichiometric requirements of the process of our invention, the complete transformation of this methane in accordance with Equation 1 requires 26.5 m.³ $O_2$ (at standard temperature and pressure—STP) for each 100 m.³ (STP) of coke-oven gas. The 1 m.³ (STP) $CO_2$ contained within each 100 m.³ (STP) of the coke-oven gas reacts according to Equation 3 with 1 m.³ (STP) of methane so that only 26 m.³ (STP) of oxygen is actually required by the stoichiometry of the reaction with the coke-oven gas.

Upon introduction of the coke-oven gas and oxygen into the cyclone burner 10, the first-stage reaction is carried out to produce a gas mixture of the following analysis (STP):

| | M.$^3$ |
|---|---|
| $CH_4$ | 31 |
| $H_2$ | 58 |
| $CO$ | 34 |
| $CO_2$ | 11 |
| $H_2O$ | 20 |
| $N_2$ | 20 | or, in volume percent,

| | |
|---|---|
| $CH_4$ | 17.8 |
| $H_2$ | 33.4 |
| $CO$ | 19.5 |
| $CO_2$ | 6.3 |
| $H_2O$ | 11.5 |
| $N_2$ | 11.5 |

At the conclusion of the second-stage reaction the following gas mixture is obtained (STP):

| | M.$^3$ |
|---|---|
| $CH_4$ | 5 |
| $H_2$ | 127 |
| $CO$ | 69 |
| $CO_2$ | 2 |
| $H_2O$ | 3 |
| $N_2$ | 20 | which corresponds to a mixture of the following composion in volume percent:

| | |
|---|---|
| $CH_4$ | 2.2 |
| $H_2$ | 56.2 |
| $CO$ | 30.6 |
| $CO_2$ | 0.9 |
| $H_2O$ | 1.3 |
| $N_2$ | 8.8 |

The invention described and illustrated is believed to admit of many modifications within the ability of persons skilled in the art, all such modifications being considered within the spirit and scope of the appended claims.

We claim:

1. A plant for producing a metallurgical reduction gas comprising a pair of elongated reaction chambers each having a respective latticework of a refractory heat-storage material; respective cyclone burners opening directly into each of said reaction chambers at one end thereof for passing combustion products without interruption into the respective reaction chamber; said chambers having outlets for conducting a reducing gas therefrom at their cool ends; first duct means connected with said cyclone burner for supplying a hydrocarbon-containing gas and an oxygen-containing gas thereto; second duct means connected to said cyclone burners for supplying a heating gas thereto for raising the temperature of said latticeworks to 1000° C. to 1400° C.; first valve means in said first duct means and second valve means in said second duct means reversible for alternately supplying said heating gas to one of said cyclone burners and said hydrocarbon-containing and oxygen-containing gases to the other cyclone burner; and temperature-sensing means responsive to the temperatures in said reaction chambers for reversing said valve means upon attainment of a predetermined minimum level, between substantially 1100° C. and 1200° C., by the temperature in the reaction chamber associated with the cyclone burner to which said hydrocarbon-containing and oxygen-containing gases are supplied.

2. A plant as defined in claim 1, further comprising a line for leading a reducing gas from said outlets to a reduction furnace; temperature-control means for sensing the temperature of the reducing gas at said line and maintaining the temperature of the gas fed to said furnace within a predetermined range by admixing a cold gas therewith, said plant having a chimney; and third valve means for selectively connecting said reaction chambers with said chimney and with said line upon heating of said chambers and the production of reducing gas in said chambers, respectively, said third valve means being controlled by said temperature-sensing means.

References Cited
UNITED STATES PATENTS

| 2,739,878 | 3/1956 | Jolley | 23—277 |
| 2,786,741 | 3/1957 | Huebler et al. | 23—281 |
| 3,420,641 | 1/1969 | Milbourne et al. | 48—214 X |

MORRIS O. WOLK, Primary Examiner

R. E. SERWIN, Assistant Examiner

U.S. Cl. X.R.

23—277, 284; 48—107, 215; 252—373; 266—1, 9